July 28, 1953  B. T. VIG ET AL  2,646,730
ROAD MACHINE
Filed Nov. 1, 1949  3 Sheets-Sheet 1
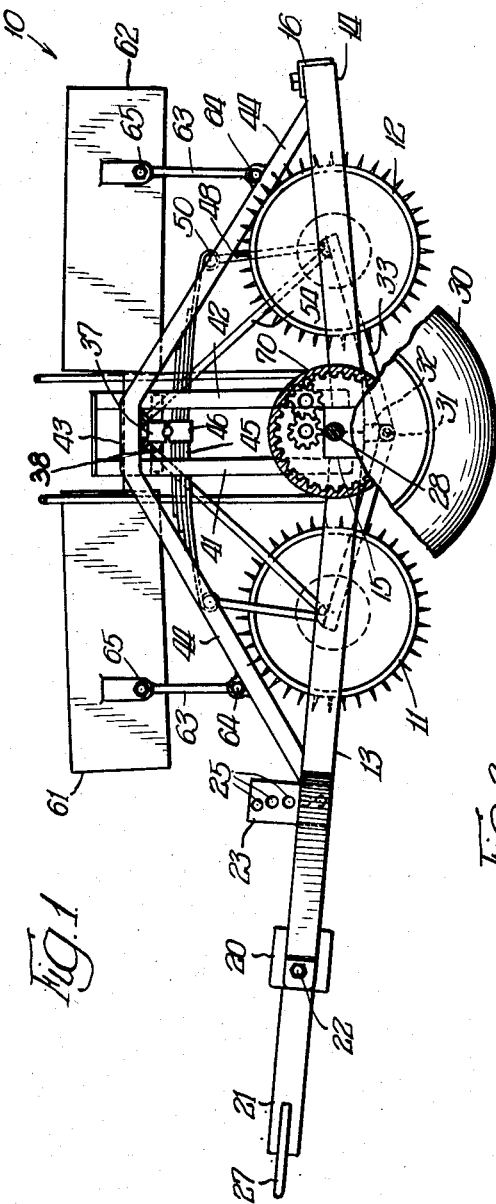
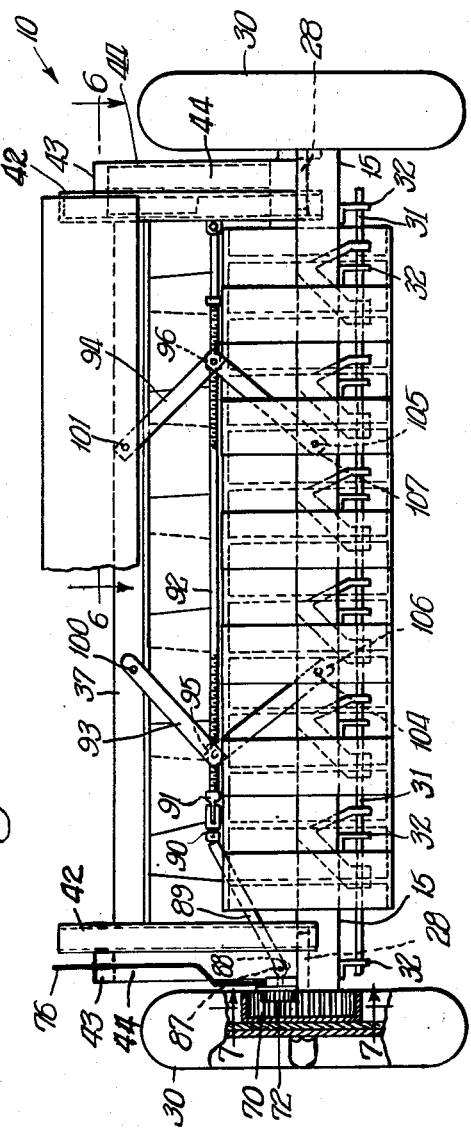
INVENTORS.
Bennie T. Vig.
BY Arthur H. Fischer,
Cromwell, Greist & Warden
Attys.

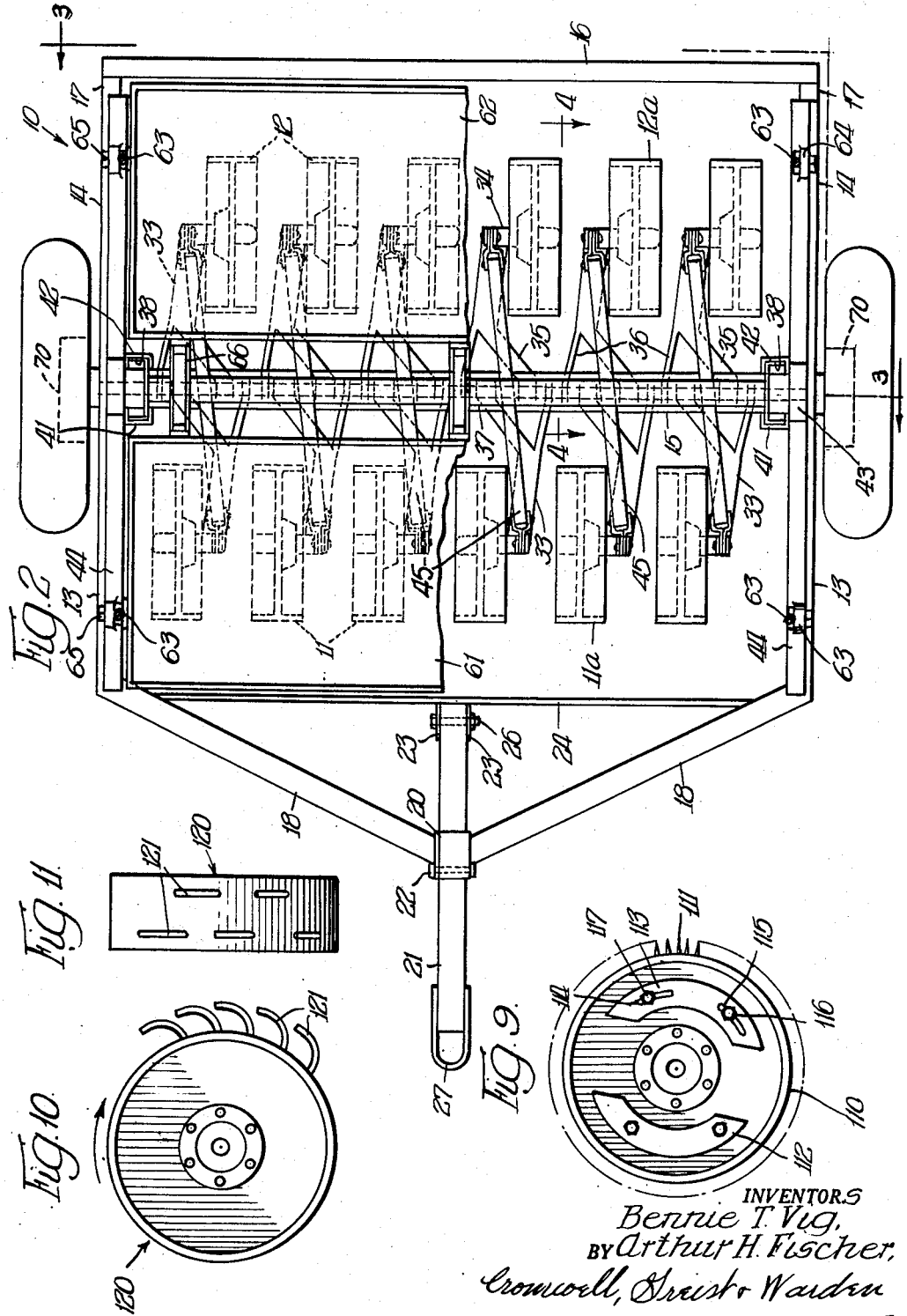

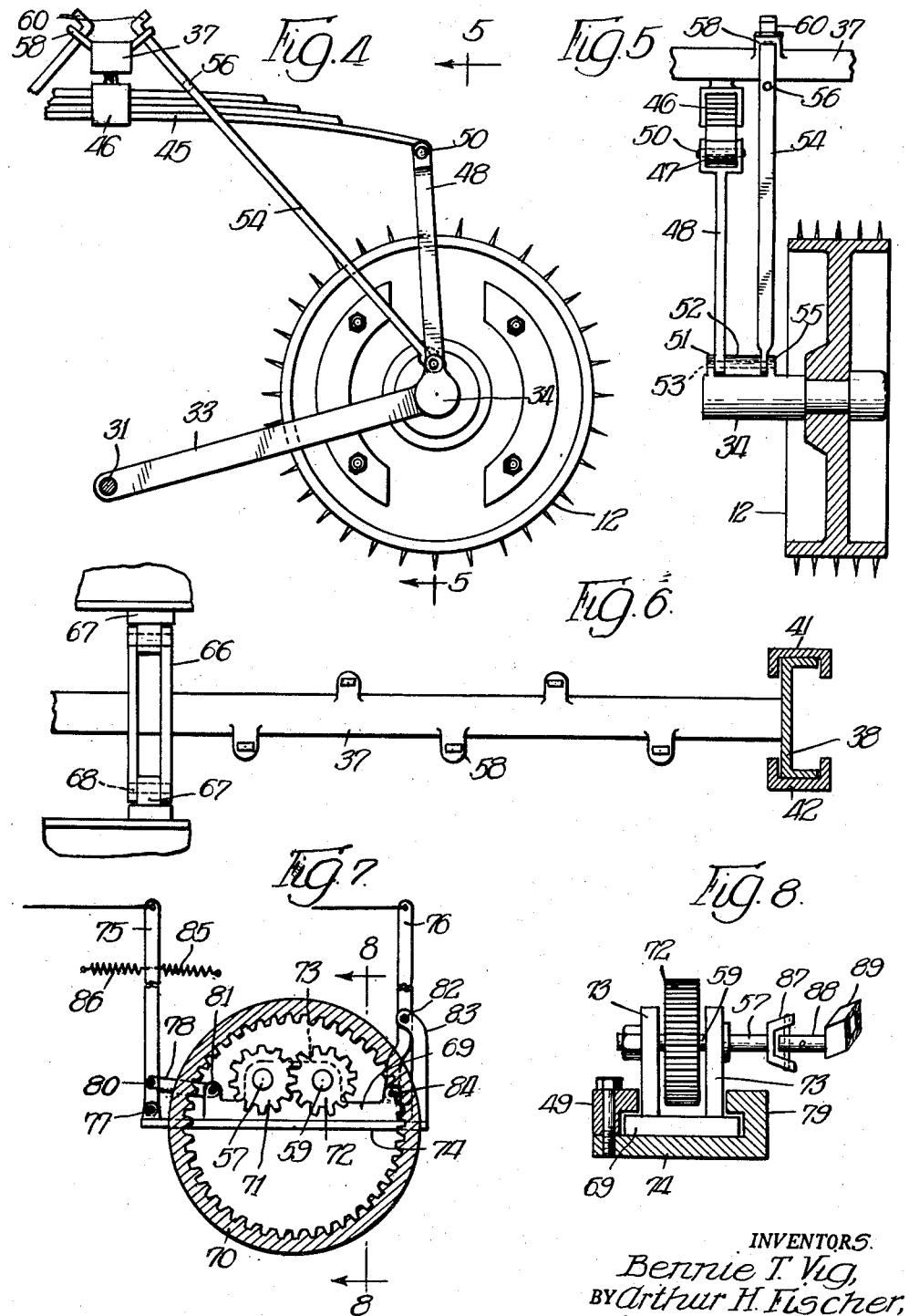

Patented July 28, 1953

2,646,730

UNITED STATES PATENT OFFICE 2,646,730

ROAD MACHINE

Bennie T. Vig, Morris, and Arthur H. Fischer, Alexandria, Minn.

Application November 1, 1949, Serial No. 124,884

8 Claims. (Cl. 94—50)

The present invention relates, generally, to road machinery, and more specifically, it relates to innovations and new and useful improvements in machines which are useful all the year around in connection with the construction and maintenance of highways, parking lots, air fields, etc., which machines are capable of being towed cross-country at normal highway speeds. Certain features of the invention make it particularly useful in connection with cross-country transportatable machines for breaking up ice and compacted snow on road and highway surfaces.

Although the invention has had its greatest utility in connection with construction and maintenance of highways, parking lots, airfields, etc., where it has been used to remove ice and compacted snow, to stabilize rod surfaces, and in the application of black-top or bituminous surfacing, it will be understood that the invention is generally useful in connection with ground surface working operations and is useful for agriculture purposes.

An important object of the invention is a ground working machine of the class described adapted to be towed on transporting wheels behind a motor vehicle for cross-country movement at normal highway speeds, and having a plurality of sets of ground working wheels wherein each ground working wheel is individually supported to permit a desired degree of independent movement with all of the ground working wheels being supported together in order to be raised and lowered as a single unit.

Another important object of the invention is a ground working machine of the class described having a pair of transporting wheels on opposite sides with a front and a rear set of ground working wheels extending across the machine, the wheels in both sets being supported as a single unit from a common support member which is operatively connected with a jack mechanism arranged to be driven from one of the transporting wheels.

An important object of the invention is a ground working machine of the class described having a pair of transporting wheels on opposite sides and ground working wheels intermediate the transporting wheels, the ground working wheels being supported as a single unit in a manner permitting them to be so raised or lowered in relation to the transporting wheels that: (1) the entire weight of the machine is carried by the transporting wheels; (2) the entire weight of the machine is carried by the working wheels; (3) or the weight of the machine is carried by both the transporting wheels and the working wheels in any desired distribution ratio.

A further object of the invention is a ground working machine of the class described having transporting wheels on opposite sides for cross-country mobility and having a front and a rear set of ground working wheels extending across the machine with one of the sets of ground working wheels extending in front of an intermediate arm support member with the other set of ground working wheels extending in back of the arm support, the ground working wheels in each set being uniformly spaced apart a distance equal to the width of the ground working wheels in the other set with the ground working wheels in each set aligned to track with the space between two of the ground working wheels in the other set, each of the ground working wheels being individually connected with the arm support member by means of an arm hinged at its inner end to the arm support member and attached at its outer end to the axle fixture of a ground working wheel, each of the ground working wheels also being co-supported with a ground working wheel in the other set by means of a transverse spring extending therebetween having the free ends thereof suitably interconnected to the axle fixtures of the co-supported wheels and with each spring attached at its midpoint to a common support member extending across the machine which is adapted to be raised and lowered so as thereby to raise and lower the ground working wheels in unison.

Another important object of the invention is a ground working machine of the class described having a plurality of ground working wheels co-supported to be lowered to the ground and raised therefrom, as a unit, with each of the wheels being arranged to be independently raised off the ground while the others remain thereon.

Another important object of the invention is a ground working wheel for a machine of the class described having a multiplicity of prongs projecting from the rim thereof, all of the prongs being curved the same way with the radius of curvature being such as to come out of dirt or other material which is being packed by the wheels with a minimum of disturbance to the packed dirt.

Still another object of the invention is a ground working wheel for a road machine of the class described, having a shiftable weight attached thereto to impart a thumping or pounding action as the wheel rotates over the ground surface.

Certain other objects of the einvention will, in part, be obvious and will, in part, appear hereinafter.

For a more complete understanding of the nature and scope of the invention, reference may now be had to the following detailed description of one presently preferred embodiment thereof, and certain modifications thereof, reference being made to the accompanying drawings, wherein:

Fig. 1 is a side elevational view of a ground working machine constituting a presently preferred embodiment of the invention equipped with ground working wheels for breaking ice on highways, certain parts being removed or partly broken away;

Fig. 2 is a top plan view of the machine shown in Fig. 1 with certain parts being removed or broken away;

Fig. 3 is a rear elevational view of the machine shown in Fig. 1, certain parts being shown in section and certain parts being removed or broken away;

Fig. 4 is an enlarged detail view taken generally on line 4—4 of Fig. 2;

Fig. 5 is a view taken on line 5—5 of Fig. 4;

Fig. 6 is an enlarged detail view, partly in section, taken generally on line 6—6 of Fig. 3;

Fig. 7 is an enlarged detail view, partly in section, taken generally on line 7—7 of Fig. 3;

Fig. 8 is an enlarged detail view taken on line 8—8 of Fig. 7;

Fig. 9 is a side elevational view of a modified form of ground working wheel having a shiftable weight, which may be used in connection with the machine shown in Figs. 1, 2 and 3;

Fig. 10 is a side elevational view of still another type of ground working wheel particularly useful in packing dirt; and Fig. 11 is an end elevational view of Fig. 10.

Referring now particularly to Figs. 1 to 3, the reference numeral 10 designates, generally, a road surface or ground surface working machine provided with a front set of ground working wheels 11—11 and a rear set of ground working wheels 12—12. The hobnailed wheels 11 and 12 are identical and are of the type used for breaking up ice or compacted snow of ground surfaces, and will be described below in detail in connection with Figs. 4 and 5. It will be understood that where the machine 10 is to be used for some purpose for which the hobnailed ground working wheels 11 and 12 are unsuited, they may be replaced with another type of wheel which is suitable for the work to be done.

The machine 10 has a frame, the opposite sides of which are formed by members 13—13 and 14—14 (Fig. 2) which at their inner ends are welded or otherwise suitably joined to the opposite sides of a cross beam 15. Each of the side members 13 and 14 is inclined upwardly at a small angle from the center of the machine 10, as shown in Fig. 1. The rear of the frame is closed by a rear cross member 16 extending thereacross and provided with right-angle extensions 17—17 at each end which fit into the members 14—14 as shown in Fig. 2.

The front of the frame is closed by members 18—18 extending inwardly at an angle from the forward ends of the members 13—13 and joined to opposite sides of a rectangular sleeve 20. A drawbar 21 extends through the sleeve 20 and is secured therein by a pin 22 extending through registering apertures provided therefor in the sleeve 20 and the drawbar 21.

The drawbar 21 may be tilted within the sleeve 20 about the pin 22 and at the rear end fits in between two spaced plates 23—23 secured to the front of a cross member 24. The plates 23—23 are provided with series of registering holes 25 arranged on an arc so as to accommodate a pin 26 which extends therethrough as well as through two registering holes provided in the inner end of the drawbar 21. At the front end, the drawbar is provided with a U-shaped hitching member 27.

Two stub shafts 28 (Fig. 3) are suitably secured to the interior of the cross beam 15 so as to project beyond the opposite ends thereof and serve as axles for a pair of transporting wheels 30. The wheels 30 may be standard automobile or truck wheels having pneumatic tires of suitable size to handle the weight of the machine 10 and permit its rapid movement cross-country at ordinary highway speeds.

A shaft 31 (Fig. 3) is supported by and underneath the cross beam 15 by means of L-brackets 32—32 secured to the underside of the cross member 15, as shown. The shaft 31 serves as a support for the inner bifurcated ends of a series of arms 33—33 (Fig. 2) which support the ground working wheels 11 and 12. The outer or free end of each of the arms 33 carries, or has integrally formed thereon, an end portion 34 (Figs. 4 and 5) upon which one of the working wheels 11 or 12 is supported while at the inner bifurcated ends the arms 33 are in the form of a relatively heavy prong 35 (Fig. 2) and a relatively lighter prong 36. Each of the prongs 35 and 36 forming the bifurcated end of each arm 33 terminates in an eye or collar portion which fits over the cross support shaft 31, as shown. Each of the wheels 11 and 12, as shown in Figs. 2 and 3, is spaced apart a distance equal to the width of the wheels, and the wheels 12 in the rear set are aligned to track with the spaces between the wheels 11 in the front set. Accordingly, when the machine 10 passes over the ground, the entire ground surface from one side of the machine to the other is subjected to the action of the ground working wheels.

Referring to Fig. 2, it will be seen that the larger prongs 35 of each of the arms 33 on one side of the shaft 31 fits intermediate the prongs 35 and 36 of the arms 33 on the other side of the shaft 31, while the smaller prongs 36 of the arms fit in between two of the oppositely extending arms 33. The bifurcated inner ends of the arms 33 serve to provide a firm hinge support for each of the working wheels and prevents tilting or twisting of the arms 33 and the wheels carried on the ends thereof.

When the machine 10 is in operation, the working wheels 11 and 12 touch the ground and the weight of the machine may be entirely, or partially, carried thereon, as will appear hereinafter. When the machine 10 is not in operation but is to be transported over ground, then the working wheels 11, 12 are lifted off the ground and the entire weight of the machine is carried on the transport wheels 30—30.

In the machine 10, the wheels 11 and 12 are arranged so as to be raised and lowered as a unit with respect to the wheels 30, while at the same time each of the wheels 11 or 12 is so supported that it has a certain amount of independent movement without affecting the adjacent wheels. All of the wheels 11 and 12 are supported from and connected to a cross member 37 (Fig. 3) which at its opposite ends is provided with rectangular slide members 38—38

(Figs. 2 and 6) which are arranged to slide vertically between the opposite sides of upright guides in the form of inwardly faced channel sections 41, 42. At their lower ends the channel sections 41 and 42 are secured to opposite sides of the cross member 15 as shown in Figs. 1 and 2 and adjacent the upper ends they are secured to the short horizontal sections 43—43 (Figs. 1 and 3) fitting in between the upper ends of the inclined frame members 44—44. At their lower and outer ends, each of the frame members 44 is secured to one of the side frame members 13 or 14, as shown in Fig. 2. This arrangement permits the floating cross member 37 to be raised or lowered depending upon whether the working wheels 11 and 12 are to be raised or lowered.

The manner in which each of the ground working wheels 11 or 12 is supported from the cross member 37 will be described in connection with Figs. 4 and 5 of the drawings, reference being had to Fig. 1. Each one of the front working wheels 11 is co-supported with one of the rear working wheels 12 (e. g. wheels 11a and 12a in Fig. 2) by means of a leaf spring 45 which extends underneath the member 37 in a generally front-to-rear direction. Each of the leaf springs 45 is secured to the member 37 at the midpoint of the spring by means of a shackle 46 as shown in Fig. 5. It will be apparent that the leaf springs 45 may be replaced with torsion type beam springs or other known equivalents.

Each of the leaf springs 45 terminates at opposite ends in an eye 47 and a link 48 is pivotally secured to each end of each leaf spring 45 by means of a removable pin 50 extending through the eye 47. At the lower end, each of the links 48 is pivotally connected to the axle fixture of one of the wheels 11 or 12 as shown in Fig. 5. Thus, the lower end of the link 48 may be apertured so as to register with apertures provided in the spaced ears 51 and 52 (Fig. 5) projecting from the top of the end portion 34 and having a pin 53 extending therethrough. In this manner each of the ground working wheels 11 and 12 is supported from the end of one of the beam type springs 45 and in turn from the cross member 37. This arrangement permits each of the wheels 11 and 12 to move up and down to a certain degree, independently of the other working wheels, and thereby permits each of the working wheels 11 or 12 to accommodate itself to any unevenness of the ground surface or road surface which it encounters without disturbing the action of the other working wheels.

In order that the leaf springs 45 do not carry the respective working wheels 11 and 12 while the machine 10 is being transported across country with the result that these wheels will shake and vibrate, each of the wheels is further supported from the cross member 37 by means of a flattened tie rod 54 (Figs. 4 and 5). Each of the tie rods is pivotally connected at its lower end to the end portion 34 of one of the arms 33 by means of the pin 53 extending through an aperture in the end of the link 54 and registering apertures in the ears 52 and 55. At the upper ends, each of the tie rods 54 extends through a loop 58 provided therefor on the cross member 37 with the tie rods sliding easily therethrough. The upper projecting end of each of the tie rods 54 is bent at a right angle to form a projection 60 which serves as a stop which engages the loop 58 when the member 37 is raised sufficiently to take up the slack.

In certain instances there is a need to lift one or more of the working wheels 11 or 12 out of action while the others remain lowered to working level. Thus, in using the machine 10 to remove ice or snow from a highway where tire tracks have become worn through so as to leave the road surface exposed along these narrow areas, with ice remaining between the bare tracks and on both sides thereof, it is desirable to raise those working wheels 11 and 12 which would normally follow these bare tracks, so as thereby to prevent possible injury to the bare road surface from the hobnailed working wheels. At the same time the load on the remaining wheels which break up the ice and compacted snow is increased to the extent of the load normally carried by the suspended wheels. In another situation, it may be necessary to use the machine 10 to work a strip of ground surface which is narrower than the full width of the sets of working wheels 11 and 12, with raised areas or borders on both sides of the narrow strip. In this situation it is desirable to be able to suspend some of the working wheels on both sides of the machine 10 so as to in effect reduce its effective width.

The independent suspension of the working wheels 11 and 12 is provided for by a pin-receiving aperture or hole 56 in each of the tie rods 54 at a suitable distance from the upper end thereof, as shown in Figs. 4 and 5. When it is desired to raise any one of the working wheels 11 or 12 to take it out of action, the link 48 associated with that particular working wheel is disconnected from the associated leaf spring 45 by removing the pin 50, and then the wheel is raised so as to bring the aperture 56 in the tie rod 54 above the loop 58, and a retaining pin is then inserted in the aperture 56 so as to hold the wheel in this raised position.

Although the wheels 11 and 12 may themselves have considerable weight, it is usually desirable to load them with extra weight, and for this purpose the machine 10 is provided with front and rear ballast or weight boxes 61 and 62, respectively (Fig. 1). Each of the boxes 61 and 62 is supported at its opposite ends from the upwardly inclined frame members 44 by means of links 63—63, each of which is pivotally connected at its lower end to a lug 64 projecting from the adjacent frame member 44 and is pivoted at its upper end on a pin 65 carried on the adjacent side of the box 61 or 62.

Along their inner sides, each of the boxes 61 and 62 is pivotally connected to a series of cross links 66—66 as shown in Figs. 2 and 6. At their mid-points the links 66 ride on the top of the cross member 37. The inner sides of the boxes 61 and 62, as shown in Fig. 6, are provided with lugs 67—67 having apertures which are adapted to be aligned with apertures in the opposite ends of the links 66, with pins 68 extending therethrough. By means of this pivot type connection between the inner faces or sides of the boxes 61 and 62 and the links 66—66, the cross member 37 may be raised and lowered while the weight contained in the boxes is continuously applied to the cross member 37. It will be seen that the total weight carried on the cross members 37 is in turn uniformly distributed through the leaf springs 45 to each of the working wheels 11 and 12.

One of the important and advantageous features of the present invention incorporated in the machine 10 is the ease and convenience with which the machine 10 may, on the one hand, be placed in condition for cross-country transportation on the transporting wheels 30 and then, when in position to be put to use, may, on the other hand, be placed in condition for operation with the working wheels 11 and 12 lowered. The convenient conversion from operative to inoperative transporting condition requires that jack means be provided for quickly raising and lowering the gangs or sets of wheels 11 and 12. By providing a jack which is arranged to be driven by one of the transporting wheels 30 the machine 10 may be easily handled by a single operator, usually the truck or tractor driver.

The jack mechanism for raising and lowering the cross member 37 and in turn the working wheels 11 and 12 is operated off one of the transporting wheels 30, such as the one which is provided with a ring gear 70, Figs. 1 and 3. Within the ring gear 70 and adapted to be alternately intermeshed therewith is a pair of pinion gears 71 and 72 shown at enlarged scale in Figs. 7 and 8. The pinion gears 71 and 72 are mounted on shafts 57 and 59, respectively, journaled in a pair of spaced, vertical plates 73—73 which stand up integrally from a slide member 69 which rests on, and is slidable over, a flat plate 74 which is secured or mounted on top of the cross frame member 15. The plate 74 has an L-shaped flange 79 integrally formed along one side thereof and a removable L-shaped flange 49 bolted along the opposite side thereby permitting removal of the slide 69 for cleaning or repair.

The slide 69 is adapted to be moved across the support 74 in opposite directions by means of a pair of shifting levers 75 and 76. The lever 75 is pivoted at its lower end to one end of the plate 74 as indicated at 77 and the lever 75 is connected to one end of the slide 69 by means of a link 78 pivotally pinned to the lever 75 as indicated at 80 and pivotally pinned to the slide 69 as indicated at 81.

The other operating lever 76 is pivoted at a point somewhat above its lower end as indicated at 82 to an upstanding post member 83 which extends upwardly from the adjacent end of the support platform 74. At its lower end, the lever 76 is pivotally connected at 84 to an ear projecting from the adjacent end of the slide 69.

It will be seen that when the lever 75 is pulled to the left (which is toward the front of the machine 10) the pinion gear 71 will be shifted so as to intermesh with the ring gear 70. When the rear lever 76 is moved to the left, it will shift the pinion gears to the rear so that the pinion gear 72 intermeshes with the ring gear 70. Only one of the pinion gears 71 or 72 can intermesh with the ring gear 70 at one time. In order normally to hold the pinion gears 71 and 72 in a neutral position, springs 85 and 86 are secured on opposite sides of one of the levers, e. g. 75, so as to hold the gears 71 and 72 in the neutral position whenever the levers 75 and 76 are released.

The shaft 57 on which pinion gear 71 is mounted projects through the rear plate 73 and carries one section 87 of a universal joint as shown in Figs. 3 and 8. The other section 88 of the universal joint is attached to an extensible drive shaft 89 which at its upper end carries one section 90 of a universal joint, the other section of which is indicated at 91 and is attached to a jackscrew 92. The extensible drive shaft has a square tubular section attached to the universal joint section 88, and a square rod section which fits telescopically in the tubular section and which is attached to the universal joint section 90.

The jackscrew 92 extends between the opposite halves or sections of a scissors-type jack, one section of which is indicated at 93 and the other section of which is indicated at 94. Referring to Fig. 3, it will be seen that each of the jack sections 93 and 94 at its joint carries a nut 95 and 96, respectively, through which the oppositely threaded portions of the jack driving screw 92 extend. Each of the arms of each section 93 and 94 is pivotally connected to each of the nuts 95 and 96. At their upper ends, the upper arms of the sections 93 and 94 are connected to opposite sides of the cross member 37 by means of pins 100 and 101 extending through registering apertures provided therefor. At their lower ends, the lower arms of sections 93 and 94 are pivotally connected to opposite sides of the stationary cross member or beam 15 by means of pins 104 and 105 extending through registering apertures provided therefor.

It will be seen that when the drive shaft 89 is rotated in one direction the scissor sections 93, 94 will tend to straighten out thereby lifting the cross member 37, whereas when the screw 92 is turned in the opposite direction, the scissors section will be folded so as to lower the support member 37.

The hobnailed working wheels 11 and 12 may be replaced with other types of working wheels so that the machine 10 may be put to other uses than breaking ice and snow from roads and like areas. In this way, the machine 10 may be utilized to advantage all year round. Thus, in the summer time the machine 10 may be used for bituminous or black-top surfacing by replacing the working wheels 11 and 12 with working wheels equipped with pneumatic tires or flat steel rims.

In Fig. 9 of the drawings a modified form of the working wheel 110 is shown having hobnails 111 extending from the tire portion thereof. A weight member 112 is secured in fixed position on one side of the wheel 110 while a member 113 of equal weight, provided with arcuate slots 114, 115, is mounted on the other half of the wheel and secured by clamping bolts 116, 117. The slots 114 and 115 permit the weight section 113 to be secured in a position where it does not counter-balance the stationary weight 112, thereby unbalancing the wheel 110. When this type of wheel is in place on the machine 10, it gives a pounding or thumping action which assists in the breaking or crushing of the ice or similar hard material on a road surface. This pounding action may also be obtained by eccentrically mounting the wheels 11 or 12.

In Figs. 10 and 11, still another form of ground working wheel is shown and indicated, generally, at 120, which offers unique advantages when the machine 10 is used to pack down loose dirt, sand, and the like. The wheel 120 has a plurality of curved prongs 121 projecting from the rim thereof with the plane of the prongs being parallel to that of the wheel 120. When the wheels 120 are mounted on the machine 10 so as to turn clockwise as the machine is towed, the prongs 121 serve to pack down dry dirt, sand, and the like and the prongs come out of the dirt without disturbing the top surface. The prongs may, for example, be suitably formed from one inch diameter spring steel rods.

The machine 10 operates in the following manner: With the working wheels 11 and 12 supported in the raised condition, the machine 10 is in condition to be transported cross-country behind a towing vehicle such as a truck or tractor. When the machine 10 arrives at the location where it is to be put into use, the operator from his position in the truck or tractor pulls the lever 75 forward by means of a rope attached thereto, thereby shifting the pinion gear or wheel 71 into mesh with the ring gear 70. The towing vehicle is allowed to creep or move slowly ahead and this turns the pinion wheel 71 in a counterclockwise direction and results in the jackscrew 92 also turning in a counterclockwise direction. The directions of the threads on the two threaded sections of the jackscrew 92 are such that when the screw 92 is turned in a counterclockwise direction the jack is collapsed, and the cross member 37 is lowered. As the member 37 is lowered, a point is reached where the projections 60 on the tie rods 54 no longer engage the loops 58 and the wheels 11 and 12 then become supported by the leaf springs 45. When the wheels 11 and 12 touch the ground the jack is allowed to be further collapsed so that the weight of the machine 10 is transferred, to the desired degree from the transporting wheels 30 to the working wheels 11 and 12. In this way, the entire weight of the machine 10 may be transferred to the wheels 11 and 12, or any desired portion of the weight may be transferred thereto. The machine 10 having thus been placed in operating condition with the working wheels 11, 12 on the ground, the lever 75 is released and the pinion gears 71 and 72 assume the neutral position.

The driver then proceeds to pull the machine 10 over the ground surface to be worked, such as a highway from which ice is to be taken. It will be seen that all of the weight applied to the cross support member 37 by means of the ballast put in the boxes 61 and 62 will be transmitted evenly through the springs 45 to the working wheels 11 and 12.

The ability to regulate, by means of the jack mechanism, the amount of load borne by the working wheels 11 and 12 is a very desirable feature of the machine 10 since often only a fraction of the full weight of the machine 10 is called for to produce the proper or safe pressure of the working wheels on the ground surface. For example, when the machine 10 is used to break a thin coating of ice from a black-top road, injury to the road surface can easily result from excessive pressure.

When the driver desires to remove the machine 10 from one locality and take it cross-country to another, be pulls the rope from its forward position which is attached to the lever 76 and thereby brings the pinion gear 72 into mesh with the ring gear 70. He then allows his towing vehicle to move slowly forward which results in the turning of the pinion gear 71 in a clockwise direction and the simultaneous driving of the jackscrew 92 in a clockwise direction. This causes the nuts 95 and 96 to move toward each other and causes the jack sections 93 and 94 to straighten up, thereby raising the support member 37. During the first portion of the elevation of the cross support member 37, the weight of the wheels 11 and 12 is carried by the leaf springs 45 until the loops 58 on the cross member 37 engage the projections 60 on the tie rods 54. At this point the weight is taken off the leaf springs 45 and is sustained by the tie rods 54. The driver allows the jack mechanism to raise the wheels 11 and 12 to the desired extent and then releases the rope allowing the pinion gears 71 and 72 to return to the neutral position.

The amount of friction in the jack elevating mechanism, due principally to the friction between the jackscrew 92 and nuts 95 and 96, is sufficient to maintain the jack in the position in which it is left, and a locking mechanism is not required.

Since certain changes may be made in the foregoing construction described above and shown in the accompanying drawings, without departing from the scope or spirit of the invention, it is intended that all matter thus shown or described shall be interpreted as illustrative and not in a limiting sense.

What is claimed as new is:

1. In a ground working machine of the class described having a main frame and transporting wheels on opposite sides of said frame, in combination, front and rear sets of ground working wheels disposed between opposite sides of said frame, a horizontal arm support member extending between said sets of ground working wheels and supported at opposite ends by said frame, an individual support arm for each of said ground working wheels, each of said support arms being swingably mounted at its inner end on said arm support member for swinging in a vertical plane and each of said support arms at its outer end being attached to the axle mounting of one of said ground working wheels, said support arms extending alternately on opposite sides of said arm support member with said front set of ground working wheels being mounted on the support arm extending on the front side of said arm support member and said rear set of ground working wheels being mounted on the support arms extending on the rear side of said arm support member, the ground working wheels in said rear set being staggered with respect to the ground working wheels of said front set, a horizontal common support member disposed over said arm support member from which said ground working wheels are suspended, means for adjustably positioning said common support member at different elevations over said arm support member whereby when said common support member is fully raised said ground working wheels will be lifted off the ground and when said common support member is fully lowered said transporting wheels will be lifted off the ground, yieldable compression linkage means individually interconnecting the axle mounting of each of said ground working wheels with said common support member whereby a compression load may be yieldably transmitted between said common support member and said ground working wheels, and tension linkage means interconnecting said ground working wheels and said common support member therefor so that said wheels will be lifted from the ground when said member is fully elevated.

2. The combination called for in claim 1 wherein said means for adjustably positioning said common support member is jack means interconnected between said common support member and said frame.

3. The combination called for in claim 1 wherein said ground working wheels are unbalanced thereby imparting a pounding action as the machine is pulled over the ground surface with the ground working wheels in engagement therewith.

4. The combination called for in claim 1 wherein a tie rod is connected at one end to said axle mounting of each ground working wheel and connected at the other end to said common support member, each of said tie rods having a slip connection at one of its ends and stop means to take up the slippage when the common support member is raised sufficiently to raise the ground working wheels above the ground level.

5. The combination called for in claim 1 wherein said means for adjustably positioning said common support member comprises jack means operatively interconnected between said main frame and said common support member whereby said ground working wheels may be unitarily raised above and lowered to the ground level.

6. The combination called for in claim 1 wherein a jack operating mechanism is operatively interconnected between said jack means and one of said transporting wheels.

7. The combination called for in claim 1 wherein a ballast box is disposed over each of said front and rear sets of ground working wheels, support means for each of said ballast boxes extending between the outer portions of said boxes and said machine frame with each of said support means being pivotally connected at least at one end to one of said ballast boxes or to said frame, and link means pivotally interconnecting adjacent sides of said ballast boxes and resting on the top of said common support member whereby the weight of each of said ballast boxes and its contents is continuously applied to said common support member.

8. The combination called for in claim 1 wherein said yieldable compression linkage means include leaf springs.

BENNIE T. VIG.
ARTHUR H. FISCHER.

References Cited in the file of this patent

UNITED STATES PATENTS

| Number | Name | Date |
|---|---|---|
| 1,196,464 | Lee | Aug. 29, 1916 |
| 1,673,184 | Cady | June 12, 1928 |
| 1,699,437 | Killik | Jan. 15, 1929 |
| 2,270,390 | Summers | Jan. 20, 1942 |
| 2,407,965 | Smith | Sept. 17, 1946 |
| 2,484,285 | Greiner | Oct. 11, 1949 |